(12) United States Patent
Phipps

(10) Patent No.: US 7,086,604 B2
(45) Date of Patent: Aug. 8, 2006

(54) GATE ARRANGEMENT

(75) Inventor: Anthony B Phipps, Uttoxeter (GB)

(73) Assignee: Rolls-Royce plc, London (GB)

( * ) Notice: Subject to any disclaimer, the term of this patent is extended or adjusted under 35 U.S.C. 154(b) by 246 days.

(21) Appl. No.: 10/601,635

(22) Filed: Jun. 24, 2003

(65) Prior Publication Data

US 2005/0045733 A1     Mar. 3, 2005

(30) Foreign Application Priority Data

Jul. 12, 2002   (GB) ................................ 0216127

(51) Int. Cl.
*F01D 5/18* (2006.01)
(52) U.S. Cl. ................. 236/93 R; 236/102; 415/116
(58) Field of Classification Search .............. 236/93 R, 236/101 R, 102, 33; 415/115, 116
See application file for complete search history.

(56) References Cited

U.S. PATENT DOCUMENTS

| | | | |
|---|---|---|---|
| 1,964,638 A * | 6/1934 | Kriedel .................. 236/93 R |
| 2,150,722 A * | 3/1939 | Newell .................... 236/102 |
| 2,792,180 A * | 5/1957 | Flagg ..................... 236/93 R |
| 2,872,120 A | 2/1959 | Welland | |
| 2,966,170 A | 12/1960 | Raulins | |
| 3,294,148 A * | 12/1966 | Alvarado ............... 236/93 R |
| 3,696,997 A * | 10/1972 | Gifford ................... 236/102 |
| 3,719,322 A * | 3/1973 | Gifford ................... 236/102 |
| 3,814,313 A * | 6/1974 | Beam et al. ............ 236/93 R |
| 3,977,600 A * | 8/1976 | Sheets, Jr. .............. 236/93 R |
| 4,023,731 A * | 5/1977 | Patterson ............... 236/93 R |
| 4,805,398 A * | 2/1989 | Jourdain et al. ....... 236/93 R |
| 5,879,594 A | 3/1999 | Holtzman | |

FOREIGN PATENT DOCUMENTS

| | | |
|---|---|---|
| EP | 0 281 771 A | 9/1988 |
| EP | PCT/EP93/00651 A | 9/1993 |
| GB | 1 385 801 SP | 2/1975 |
| GB | 2 354 290 A | 3/2001 |

* cited by examiner

*Primary Examiner*—Harry B. Tanner
(74) *Attorney, Agent, or Firm*—W. Warren Taltavull; Manelli Denison & Selter PLLC

(57) ABSTRACT

The gate arrangement 11 is provided in order to regulate coolant airflow in a path typically in a turbine blade 1 of a jet engine. The gate arrangement 11 includes a gate component 12 having an opening end 15 which at low temperature is closed by a gate member 14. Due to different coefficients of expansion between the gate component 12 and the gate member 14 when the arrangement 11 increases in temperature there is a divergence between a seal end 21 of the gate member 14 in order to open the opening end 15 of the gate component 12 and to allow coolant airflow through the arrangement 11. Thus, coolant airflow is allowed for high temperatures but as the gate component 12 and gate member 14 converge at sustained typically lower temperatures coolant airflow is stopped in order to prevent unnecessary cooling and so provide greater thermal efficiency.

15 Claims, 5 Drawing Sheets

GATE ARRANGEMENT

FIELD OF THE INVENTION

The present invention relates to gate arrangements and more particularly to gate arrangements used in coolant air passages of jet engines or similar machines.

BACKGROUND OF THE INVENTION

There is a requirement in a number of machines to provide cooling in order to retain the machine within acceptable operating temperatures. Typically, air or a liquid coolant is used to effectively transport heat energy from a hot region and allow it to be conventionally dispersed. Clearly, the rates of coolant flow and interface with the machine are highly determinant of the effectiveness of a coolant.

FIG. 1 in the attached drawings shows a turbine blade 1 typical of those used in a jet engine. High pressure cooling air passes through the turbine blade 1 in the direction of arrowheads A whilst low pressure cooling air passes through blade 1 in the direction of arrowheads B. In any event, the air flows in the turbine blade 1 for appropriate dispersion. Normally, the high pressure air flow in accordance with arrowheads A is towards the leading edge of the blade 1 where there will be most heating of the blade 1.

It will be appreciated that a higher level of cooling for the blade 1 is required at certain stages of engine activity, for example take off, in comparison with normal operation, for example cruising at altitude. In such circumstances, provision of air coolant through the blade 1 in a permanently open flow matrix 2 results in the engine not necessarily being operated at its optimum efficiency. It will be noted that the engine may be designed to vary the rate of air flow through the matrix 2, but this will generally be related to engine speed rather than desired cooling for engine activity.

SUMMARY OF THE INVENTION

In accordance with the present invention there is provided a gate arrangement for air coolant flow, the gate arrangement comprising a gate component which defines a passage with an opening and a gate member, the gate component and the gate member having respectively different thermal coefficients of expansion in order that the gate member selectively opens or closes dependent upon temperature.

Preferably, the gate member has a lower coefficient of expansion that the gate component and closes the opening below a specified temperature. Typically, the gate is integral with or configured for thermal coupling with a machine, such as a jet engine, which includes a coolant airflow path to regulate airflow dependent upon temperature of that machine.

Preferably, the gate member is mounted axially opposite the opening of the gate component. Alternatively, the gate member is mounted angularly to accentuate expansion towards the opening of the gate component. Typically, the gate member is adjustable relative to the opening of the gate component. Possibly, the gate member is mounted upon a screwthread to allow controlled adjustment by displacement and/or resistance torque due to compression engagement of the gate member towards the opening of the gate component.

Preferably, the gate member has a shaped end for engagement with the opening of the gate component. Typically, the shaped end will be barrelled or tapered to facilitate engagement with the opening. Possibly, the opening will be reciprocally shaped for consistency with the shaped end. Additionally, the gate member and the opening are respectively shaped to provide a labyrinthine association between them.

Possibly, the gate member combines two or more different materials with different rates of thermal expansion to alternately open and close the opening of the gate component with time at selected temperature ranges. Possibly, the gate member and/or the gate component include guide means to facilitate engagement between the gate member and the opening. Normally, the gate member will be hollow to limit its weight.

Possibly, the gate member has an engagement surface compliant with the opening.

Possibly, the gate member expands axially and/or radially in order to selectively open or close the opening of the gate component. The gate member may be shaped or include different materials in order to facilitate selective closing of respectively different openings of a gate component.

BRIEF DESCRIPTION OF THE DRAWINGS

The present invention will now be described, by way of example only, with reference to the following figures in which.

Also in accordance with the present invention there is provided an engine incorporating a gate arrangement as described above.

An embodiment of the present invention will now be described by way of example and reference to FIGS. 2, 3, 4 and 5 of the drawings in which schematic portions of a gate arrangement are depicted.

DETAILED DESCRIPTION OF THE DRAWINGS

In a turbine and in particular, a turbine blade, high thermal efficiency is dependent upon high turbine entry temperature which in turn is limited by the turbine blade material. Continuous cooling of these components allows their environmental operating temperature to exceed the materials melting point without affecting the blade integrity. However, as indicated with prior art cooling arrangements there can be a detrimental factor with regard to continuous cooling which affects overall thermal efficiency. Typically, the cooling arrangement is rated dependent upon the expected highest temperatures to be experienced by the turbine blade, but these temperatures may be transient such that there is over cooling for substantial periods of engine operation.

Figure 2:
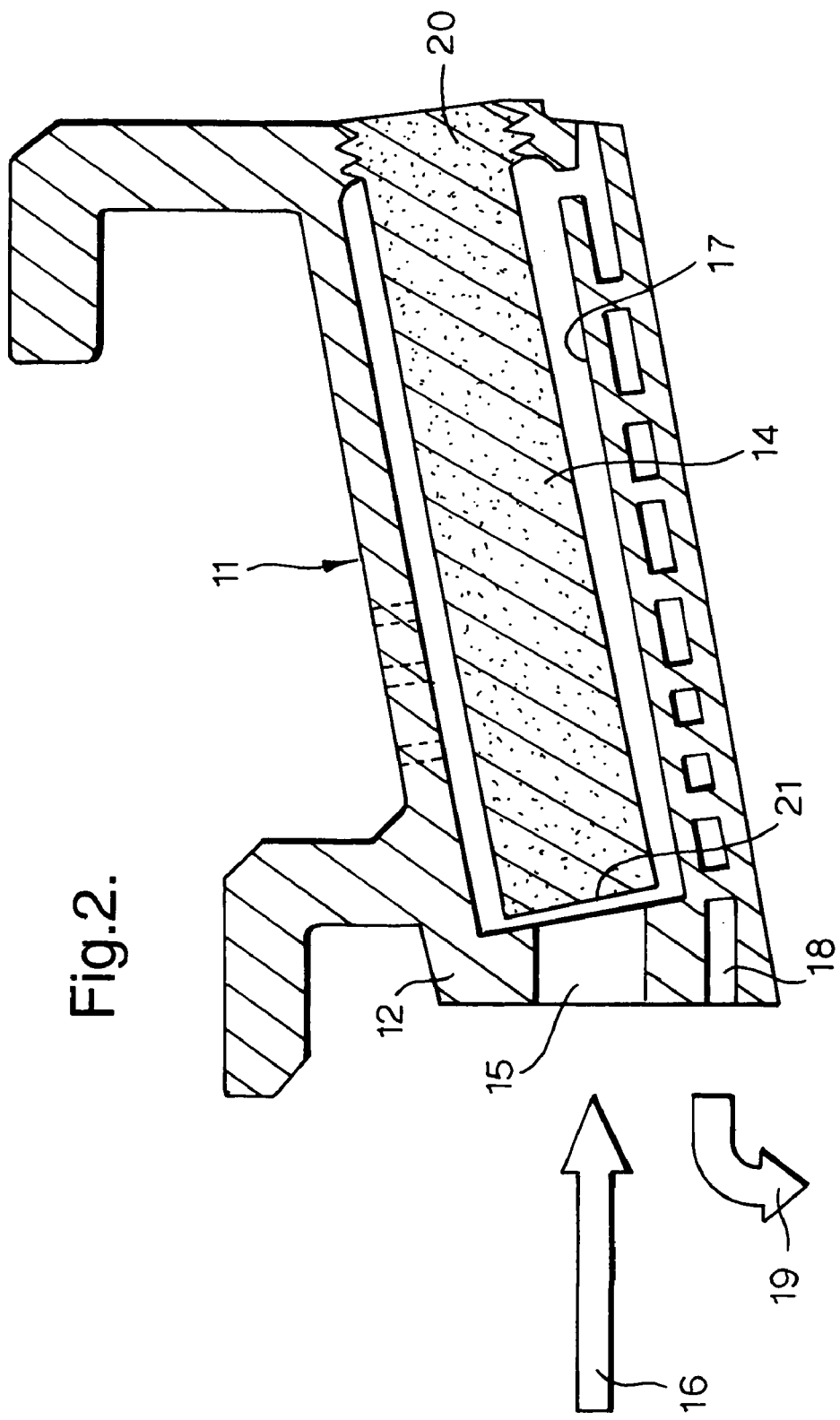
FIG. 2 is a schematic cross sectional view of a gate arrangement in accordance with the present invention.

FIG. 2 illustrates in a schematic cross-section a gate arrangement 11 in accordance with the present invention. The arrangement 11 comprises a gate component 12 and a gate member 14. The gate component 12 defines a passage 15 through which coolant air can pass in the direction from arrowheads 16 through an internal bore 17 of the component 12 and out through an outlet 18 in the direction of arrowhead 19. The gate member 14 is mounted at one end 20 in order to present a distal end 21 of the member 14 to an opening end 15 of the gate component 12.

Figure 1:
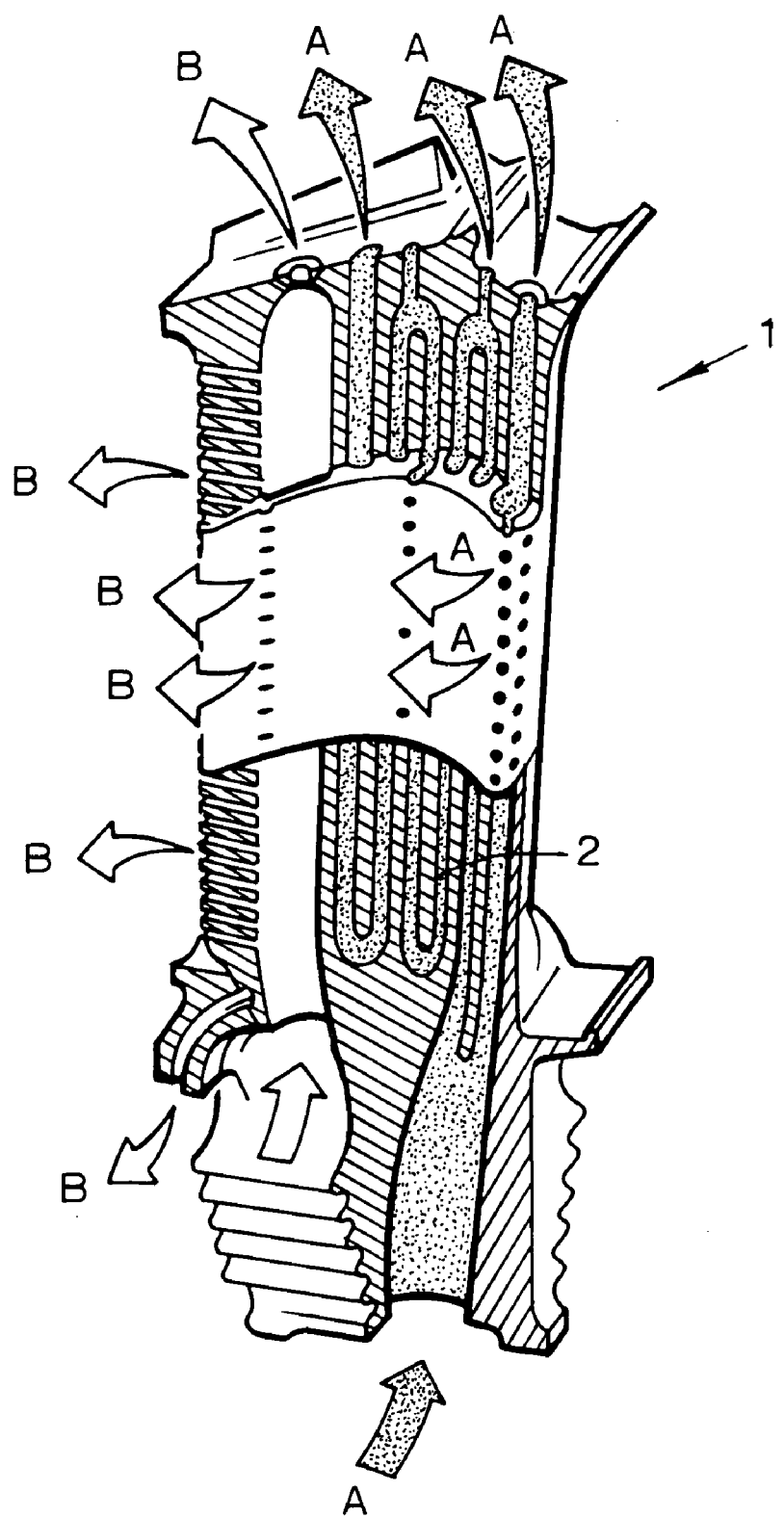
FIG. 1 is a cross sectional view of a turbine blade.

The gate arrangement 11 is located in a coolant air flow passage of an engine or machine such as the high pressure passages in the matrix 2 defined in the turbine blade 1 depicted in FIG. 1. The gate arrangement 11 is in good thermal connection with the turbine blade such that as the blade is heated by combustion gases the gate arrangement 11 is also warmed. Alternatively, the component 12 could be an integrally formed part of the blade.

The gate component 12 and the gate member 14 are made from materials which have significantly different coefficients of thermal expansion in this context of the present invention. Thus, as the gate arrangement 1 is warmed the gate component 12 and the gate member 14 will expand or alter their dimensions by differing amounts and at differing rates. In such circumstances, the opening end 15 of the gate component 12 is selectively opened and closed by the gate member 14 in order to allow coolant air to flow as described previously in the direction of arrowheads 16, 19 and through bore 17. In a jet engine, typically, there will be engine cycles or operational stages where the combustor significantly heats the turbine blades whilst at other times during normal operation there is less heating of the blades. An example of a stage at which the engine will be at high temperature is take off. In such circumstances, in accordance with the present invention the turbine blade and therefore the gate arrangement 11 will be heated. This heating of the gate arrangement 11 will cause thermal expansion of the gate component 12 and also the gate member 14. Thus, if the gate member 14 has a significantly different coefficient of thermal expansion lower than that of the gate component 12 then the passage 15 will open to allow coolant air flow in order to cool the associated turbine blade. It will also be appreciated that the gate member 14 as a centrally located component will also through a thermal gradient from the exterior of the gate arrangement and, when opened, through coolant airflow adjacent to the gate member 14, be subject to a degree of thermal lag relative to the gate component 12 and its associated turbine blade.

The degree of differential between the coefficients of thermal expansion for the gate component 12 and the gate member 14 can be quite small and modest as there is a multiplication factor dependent upon the cross-sectional area of the opening 15. Thus, a displacement differential due to the different coefficients of thermal expansion between the component 12 and the member 14 in the order of 1 mm may be sufficient to open the gate arrangement 11 in order to allow adequate airflow for cooling. It will also be appreciated that coolant air flow will also be forced.

Typically, as illustrated in FIG. 2 the gate member 14 will be held in a cantilever configuration with the gate member 14 secured at a mounted end 20 through a screwthread whilst a distal sealing end 21 is adjacent the open end 15 of the gate component 12. When cold, the gate member 14 through its distal end 21 will be in compressive engagement about the opening end 15 in order to seal and prevent coolant airflow. The degree of compression presented by the gate member 14 is essentially set by the resistive torque applied for displacement at the mounting end 20. Furthermore, this degree of compression of the gate member 14 into the opening end 15 or the gate component 12 effectively presents a displacement bias such that the gate member 14 to gate component 12 thermal expansion differential must overcome this displacement bias before there is sufficiently differential to open the open end 15 to allow coolant airflow.

Figure 3:
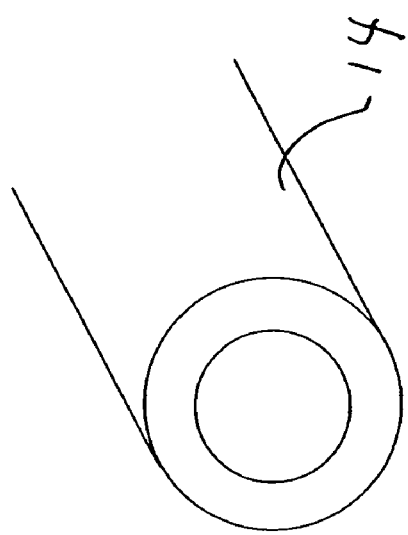
FIG. 3 is a cross sectional view of a portion of the gate arrangement shown in FIG. 2.
Figure 4:
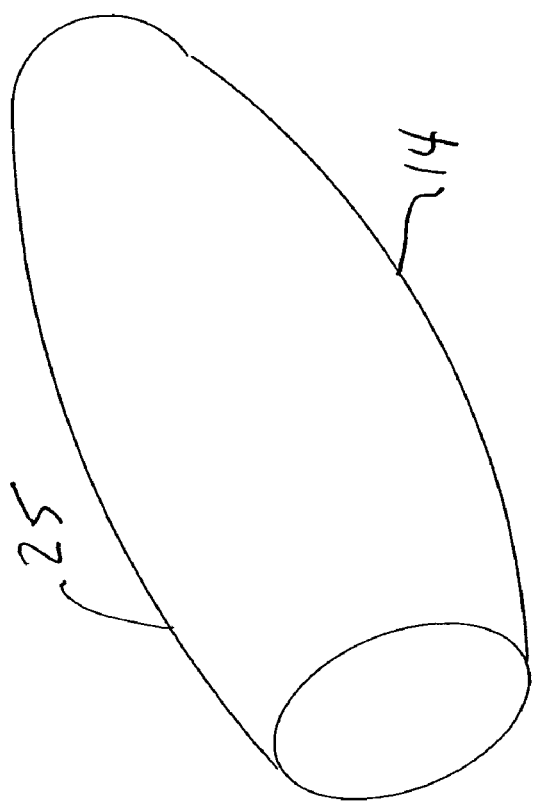
FIG. 4 is a perspective view of a portion of the gate arrangement shown in FIG. 2.
Figure 5:
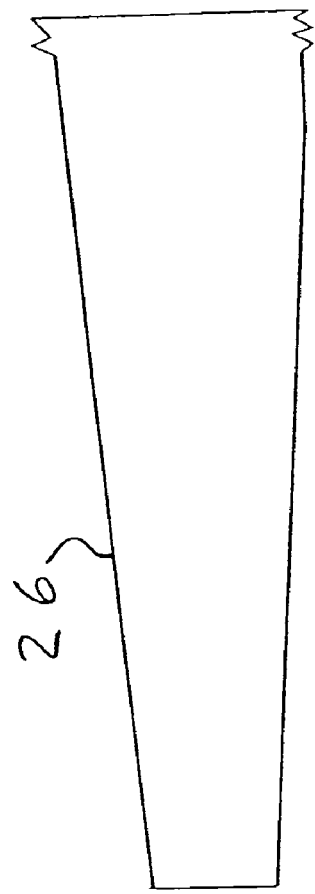
FIG. 5 is a side view of a portion of the gate arrangement shown in FIG. 2.

Typically, the gate arrangement 11 will be used with a jet engine incorporated in an aircraft. Thus, component weight considerations apply and the gate member 14 in particular will normally be hollow as shown in FIG. 3, in order to reduce its mass contribution to the overall weight of the arrangement 11. Generally, the distal sealing end 21 of the gate member 14 will be solid in order to provide a full cross-section seal to the opening end 15 of the component 12. However, provided there is sufficient overlap between the end edges of the gate member 14 in abutment with the shoulder portions of the opening end 15 then the gate member 14 may be a tube but with a hollow center for its whole length. Alternatively, the hollow core of a gate member 14 may be filled with a light weight foam or other material such as a refractory composition. As shown in FIGS. 4 and 5, the gate member may be barreled or tapered as at 25 and 26, respectively. Further, the gate component may have a major axis as indicated at 28 and the gate member 14 will extend in alignment with this axis 28 as shown in FIG. 2.

Essentially in an ideal situation the gate arrangement should only open when there is sufficiently high temperature presented for a predetermined time period. The present gate arrangement 11 utilises differentials in the thermal coefficient of expansion between at least the gate component 12 and the gate member 14. However, it will also be appreciated that refinements to the present gate arrangement could include utilisation of differential rates of thermal expansion as opposed to simply coefficients of thermal expansion in order that the open end 15 is opened for a predictable period of time during which the expansion of the gate member 14 "catches up" with that of the gate component 12 in order to again close the open end 15 in order to prevent coolant airflow. In such circumstances, two or more sets of gate arrangements in accordance with the present invention may be provided to open respective coolant airflow paths over a timed sequence relative to temperature ranges in order to further enhance turbine blade cooling performance and therefore efficiency of an engine incorporating those turbine blades. Initially, relatively narrow coolant air paths may be opened by one set of gate arrangements whilst if the temperature is sustained wider or more coolant airflow paths will be opened by a second set of gate arrangements. Relative contraction of the gate member in comparison with the gate component in the second set of gate arrangements being set such that if sustained for a period of time a warning is provided as to the over heating of the associated turbine blade whilst retaining its operability until service/maintenance is available.

As an alternative to axial relative displacement between the gate member 14 and the gate component 12 it will be appreciated that radial, divergence between the gate member and radial opening ends for coolant airflow could be provided. Thus, for example, a gate member could be super cooled in order to provide for contraction of that gate member such that it could be inserted in a passage including radial openings (notionally shown as broken lines in FIG. 2) such that as the super cooled gate member expands as it returns to ambient temperature there is a compression of that gate member into the radial opening ends which provide the divergence or displacement bias which must be overcome due to the relative differentials in coefficient and/or rate of thermal expansion as the gate arrangement increases in temperature during operation.

As indicated previously, where the gate member 14 is mounted through a screwthread at a mounting end 20, the gate member 14 is adjustable in terms of the necessary time scale and temperature range at which the opening 15 will open in order to allow coolant airflow. Furthermore, the distal sealing end 21 of the gate member 14 will typically be shaped in order to provide more selective control as to when the gate member 14 opens and/or closes the opening 15 of the gate component. Thus, for example, the distal sealing end 21 may have barrel or tapered cross-section in order to provide a greater increase in available cross-section for coolant airflow for relative divergence of the gate member 14 from the opening 15 in comparison with a flat overlap relationship where the cross-section is essentially that determined by the gap between the distal sealing end 21 and the edge of the opening end 15. Clearly, the opening end 15 itself may be reciprocally shaped for consistency with the shaping of the distal sealing end 21 of the gate member 14. In such circumstances, by the associate shaping of the distal sealing end 21 and the opening end 15 of the gate component 12 there can be a rapid fall away from the abutment positions in relation to divergence of the opening end 15 and the distal sealing end 21 of the gate member 14 to disproportionately increase the available cross-section through which coolant air can flow.

Where appropriate the gate member may comprise two or more different materials with respectively different coefficients and/or rates of thermal expansion. These two or more different materials could be arranged in series. For example, in the axial embodiment depicted in FIG. 2 respective segments of each of the materials could be secured in alignment such that through temperature Increase different rates of divergence from the surrounding gate component may be achieved dependent upon temperature in terms of actual temperature and rapidity of rising temperature along with time periods at particular temperature ranges such that selective opening and/or closing of the opening end can be achieved dependent upon desired coolant airflow for efficiency. Alternatively, within the limits of elasticity, respective concentric sleeving of different materials could be provided such that there is radial divergence/expansion into engagement with radially opening ends presented in the gate component.

It will be appreciated that coolant airflow rates and speeds will be high. Thus, in order to prevent oscillation particularly in a cantilever presented gate member and in order to appropriately present the gate member through its distal sealing end 21 such that a stabilising guide may be provided. This may comprise a substantially stable detent or detents balanced across the gate member in respective channels in order to guide at least the distal sealing end 21 towards the opening end 15 of the gate component 12. Clearly, these guides should not diminish the available cross-section for coolant airflow to a significant extent.

The distal sealing end 21 of the gate member 14 may be made from a relatively compliant material at low temperatures. Thus, despite the nature of the bulk of the material from which the gate member 14 is formed, a good seal will be provided by the distal sealing end 21 in order to prevent coolant airflow until the differential expansion between the gate component 12 and the gate member 14 at the desired temperature or for an appropriate time period at that temperature so as to cause the necessary divergence to open the opening end 15. Where the distal sealing end 21 of the gate member 14 is compliant, care will be taken with regard to use of resistive torque as described previously in respect of a screw mounting of the gate member 14 in terms of determining the displacement bias before relative thermal expansion opens the opening end 15 of the gate component 12. The compliant nature to the distal sealing end 21 of the gate member 14 may be provided by the nature of the material, i.e. its elasticity/plasticity or by use of a mechanical assembly such as a seal plate held upon a mechanical or hydraulic spring.

As an alternative to providing that a gate member is in compression against the under side of the opening end of the gate component it is possible to provide a configuration of the gate arrangement in which the gate member is in tension. Thus, a stem of the gate member will extend through the opening end of the gate component with a "top hat" or "mushroom" section of the gate member then extending radially from the stem. In such circumstances, when the cold the top hat or mushroom extension would engage the opening end in order to prevent coolant airflow whilst through a differential in thermal expansion due to a higher coefficient of expansion for the gate member compared to the gate component the stem would extend quicker than the expansion of the gate component such that the top hat or mushroom portion would diverge or lift off from the open end in order to allow coolant airflow through the opening end as described previously.

Where desired a labyrinthine association between the opening end of the gate component and the gate member could be formed. Thus, coolant airflow would be prevented when cool due to the labyrinthine seal of the gate member in compression or tension against associated levels in the open end of the gate component. Once at the selected temperature, a differential thermal expansion between the gate member and the gate component would then open the labyrinthine seal such that airflow would pass but be regulated by the effective baffles created by the interleaving plates of the labyrinthine seal which previously where held in compression or tension engagement.

In a typical embodiment of the present invention as illustrated in FIG. 2 the gate member 14 is a relatively low expansion part in comparison with the gate component 12. This low expansion is facilitated by the nature of the material and possibly by presentation of the gate member 14 as a hollow tube with a sealed end 21 for engagement with the opening end 15 of the gate component 12. Essentially, the gate member 14 will be screwed into compressive engagement through the distal sealing end 21 until the resistive torque is of a pre-described value. This creates an essential displacement bias or expansion lag before the opening end 15 opens to allow coolant airflow. In short, as temperature increases, the gate member 14 expands less than the gate component 12 such that some cooling air enters the bore 17 or chamber for circulation from input (arrowhead 16) to output (arrowhead 19). This coolant airflow will cool the gate arrangement 11 and associated turbine blade. The rate of coolant airflow is dependent upon the temperature of the coolant air as this will inhibit further expansion of the gate member and also external boundary temperature and conditions which will initially act upon the gate component 12 before the gate member 14. As described previously as temperature increases then current airflow also increases. By varying the resistance torque and so the displacement or divergence bias for the gate member 14 the degree of cooling to occur at different engine conditions can be tuned to a desired level.

By ensuring that there is a relatively large cross-section for the opening end 15 quite small differential movements due to the different expansion rates of the gate component 12 to the gate member 14 can be operationally acceptable. Typically, the opening end 15 will have a cross sectional area of 7 to 10 square millimeters such that a relative divergence of up to 1 mm is sufficient to open the gate arrangement 11 for coolant airflow.

By providing shaping between the distal sealing end 21 and the opening end 15 a degree of "bedding" for good sealing can be provided.

The present invention utilises the differential and thermal expansion of the gate component 12 in comparison with the gate member 14 both as a result of the nature of the material and the external boundary temperature presentation whereby the gate component 14 is heated through the gate component 12 such that there is a difference in the specific rates of thermal expansion in order to at least open the open end 15 to coolant airflow for a period of time. Thus, in situations such as aircraft takeoff where an engine will be at high temperature for a nominally expected period of time rather than permanently the time delay for the gate member 14 to "catch up" in expansion with the gate component 12 provides a time window during which coolant airflow is allowed whilst when the temperature is reduced the gate member 14 can again catch up or return to its sealing engagement with the opening end 15 in order to prevent coolant airflow such that there is no unnecessary cooling of the gate arrangement 11 and therefore its associated turbine blade leading to less efficient operation.

As there are no mechanical components to the present gate arrangement its reliability is high with low maintenance. Furthermore, there are no requirements for high manufacturing tolerances such that installation is cheap. The present gate arrangement allows coolant airflow when needed, i.e. at high temperature for periods of time but reduces coolant airflow when not necessary during normal long term operation.

Although described with regard to a turbine blade, it will be appreciated that the invention could also be used for cooling and regulating the temperature of other turbine components such as vanes and segments.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gate arrangement for an air coolant flow, the gate arrangement comprising a gate component which defines a passage with an opening and a gate member, the gate component and the gate member having a respectively different thermal coefficients of expansion in order that the gate member selectively opens or closes the opening dependent upon temperature wherein the gate member has a lower coefficient of expansion than the gate component in order that the gate member closes the opening below a specific temperature and wherein the gate member is adjustable relative to the opening to allow compression of the gate member into the gate component thereby presenting a displacement bias which, in use of the gate arrangement, must be overcome before a flow of coolant through the opening is enabled.

2. An arrangement as claimed in claim 1 wherein the gate arrangement is one of integral with and configured for thermal coupling with a machine which includes a coolant airflow path to regulate airflow dependent upon the temperature of that machine.

3. An arrangement as claimed in claim 1, wherein the gate member is mounted axially opposite the opening of the gate component.

4. An arrangement as claimed in any of claims 1, wherein the gate member is mounted at an angle to the axis of the opening of the gate component.

5. An arrangement as claimed in claim 1 wherein the gate member is adjustable by a screwthread mounting to allow controlled adjustment by one of displacement and resistive torque due to one of compression and extension engagement of the gate member with the opening.

6. An arrangement as claimed in claim 1 wherein the gate member has a end shaped for engagement with the opening of the gate component.

7. An arrangement as claimed in claim 6 wherein the shaped end is one of barrelled and tapered in cross-section to facilitate the engagement with the opening.

8. An arrangement as claimed in claim 7 wherein the opening is reciprocally shaped for consistency with the shaped end of the gate member.

9. An arrangement as claimed in claim 1 wherein the gate member comprises at least two different materials with differing rates of thermal expansion to alternately open and close the opening of the gate component with time at selected temperature ranges.

10. An arrangement as claimed in claim 1 wherein the gate member is substantially hollow.

11. An arrangement as claimed in claim 10 wherein the gate member has a closed end for engagement with the opening of the gate component.

12. An arrangement as claimed in claim 1 wherein the gate member includes a compliant engagement surface for engagement with the opening of the gate component.

13. An arrangement as claimed in claim 1 wherein the opening is substantially in alignment with the major axis of the gate member.

14. A turbine blade including a gate arrangement as claimed in claim 1 in an air coolant path in that turbine blade.

15. A jet engine including a turbine blade as claimed in claim 14.

* * * * *